(12) United States Patent
Dallum

(10) Patent No.: US 8,315,290 B2
(45) Date of Patent: Nov. 20, 2012

(54) UWB MULTI-BURST TRANSMIT DRIVER FOR AVERAGING RECEIVERS

(75) Inventor: Gregory E. Dallum, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 437 days.

(21) Appl. No.: 12/637,551

(22) Filed: Dec. 14, 2009

(65) Prior Publication Data

US 2012/0189034 A1    Jul. 26, 2012

Related U.S. Application Data

(60) Provisional application No. 61/138,410, filed on Dec. 17, 2008.

(51) Int. Cl.
*H04B 1/69* (2011.01)
*H04B 1/707* (2011.01)
*H04B 1/713* (2011.01)

(52) U.S. Cl. ........ 375/130; 375/295; 375/259; 375/140; 375/146; 330/172; 330/173

(58) Field of Classification Search .................. 375/130, 375/295, 259, 140, 146; 330/173, 172
See application file for complete search history.

(56) References Cited

U.S. PATENT DOCUMENTS

| | | | |
|---|---|---|---|
| 6,937,667 B1* | 8/2005 | Fullerton et al. | 375/295 |
| 7,792,229 B2* | 9/2010 | Sanada et al. | 375/354 |
| 8,160,118 B2* | 4/2012 | Dallum et al. | 375/130 |
| 2004/0087291 A1* | 5/2004 | Wada | 455/216 |
| 2005/0095980 A1* | 5/2005 | Chang | 455/3.02 |
| 2005/0117658 A1* | 6/2005 | Jun | 375/295 |
| 2006/0291537 A1* | 12/2006 | Fullerton et al. | 375/145 |
| 2010/0232472 A1* | 9/2010 | Dallum et al. | 375/130 |
| 2011/0013673 A1* | 1/2011 | Dallum et al. | 375/146 |

* cited by examiner

*Primary Examiner* — Phuong Phu
(74) *Attorney, Agent, or Firm* — Henry Sartorio; John P. Wooldridge

(57) ABSTRACT

A multi-burst transmitter for ultra-wideband (UWB) communication systems generates a sequence of precisely spaced RF bursts from a single trigger event. There are two oscillators in the transmitter circuit, a gated burst rate oscillator and a gated RF burst or RF power output oscillator. The burst rate oscillator produces a relatively low frequency, i.e., MHz, square wave output for a selected transmit cycle, and drives the RF burst oscillator, which produces RF bursts of much higher frequency, i.e., GHz, during the transmit cycle. The frequency of the burst rate oscillator sets the spacing of the RF burst packets. The first oscillator output passes through a bias driver to the second oscillator. The bias driver conditions, e.g., level shifts, the signal from the first oscillator for input into the second oscillator, and also controls the length of each RF burst. A trigger pulse actuates a timing circuit, formed of a flip-flop and associated reset time delay circuit, that controls the operation of the first oscillator, i.e., how long it oscillates (which defines the transmit cycle).

24 Claims, 10 Drawing Sheets

UWB MULTI-BURST TRANSMIT DRIVER FOR AVERAGING RECEIVERS

RELATED APPLICATIONS

This application claims priority to U.S. Provisional Application Ser. No. 61/138,410 filed Dec. 17, 2008, which is herein incorporated by reference.

GOVERNMENT RIGHTS

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

This invention pertains generally to ultra-wideband communications, and more particularly to ultra-wideband (UWB) transmitters.

2. Description of Related Art

Ultra-wideband (UWB) wireless communication is based on the transmission of data in extremely short, e.g., 50-1000 ps, pulses spread out over a broad frequency range or bandwidth, typically several GHz, of the electromagnetic spectrum. Large data bursts, e.g., hundreds of Gb/s, are possible because the data are carried simultaneously at a wide range of frequencies across the electromagnetic spectrum.

UWB communications offers many advantages. UWB signals are more difficult to detect than narrowband (essentially single frequency) signals. The combination of broad spectrum, low power, and extremely short pulses also cause much less interference with other devices than do conventional narrowband wireless systems. Also, UWB is much more resistant to electrical interference from other devices than other wireless technology. Thus, UWB's data capacity, speed, low power requirements, and resistance to interference make it attractive as a communications technology.

UWB pulses spread the transmitted energy over many frequencies, over a band of typically several GHz, as opposed to traditional narrowband, which generally operates as a continuous wave at a specific frequency and covers a limited band of about 30 KHz. Cellular phones operate in the wideband, which covers about 5 MHz. UWB bandwidth provides high capacity, resistance to jamming, and low probability of detection. Thus UWB provides an attractive alternative to the other communications technologies. At present, the FCC restricts commercial UWB systems, but Government use is less restricted. UWB appears very promising for the future.

One type of receiver used in UWB communications systems is a delay and multiply receiver in which a received pulse is multiplied by a delayed prior received pulse to increase the magnitude. This requires a precise spacing between the transmitted pulses so that the delay can be chosen so that the presently received pulses are coincident with the delayed previously received pulses. It is also required that the pulses be in phase so that when they are multiplied they do not cancel out.

Thus, it is desirable to provide an UWB transmitter capable of generating a sequence of RF bursts with precise spacing between the bursts.

It is also desirable to provide an UWB transmitter capable of generating a precisely spaced sequence of RF bursts where each burst starts up at the same phase as the other bursts.

SUMMARY OF THE INVENTION

An aspect of the invention is an ultra-wideband (UWB) multi-burst transmitter, formed of a timing circuit actuated by a single trigger pulse to set the length of a transmit cycle; a gated burst rate oscillator connected to and controlled by the timing circuit to generate an output signal comprising a plurality of cycles during the transmit cycle; a bias driver connected to the gated burst rate oscillator; and a RF burst oscillator connected to the bias driver and actuated thereby in response to the output signal from the gated burst rate oscillator to generate a sequence of RF bursts, one RF burst for each cycle of the output signal from the gated burst rate oscillator during the transmit cycle.

Another aspect of the invention is a method of generating a precisely spaced sequence of ultra-wideband (UWB) RF bursts, each starting with the same phase, from a single trigger pulse, by generating a timing signal from the trigger pulse, the timing signal defining a transmit cycle; controlling a first oscillator by the timing signal to produce a number of cycles of a relatively low frequency square wave output during the transmit cycle; and driving a second oscillator with the output of the first oscillator to produce a spaced sequence of RF bursts of much higher frequency during the transmit cycle, an RF burst being produced by the second oscillator on each cycle of the first oscillator signal.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, without departing from the basic concepts as disclosed herein.

The invention is a multi-burst transmitter that is used in ultra-wideband (UWB) communication systems. The circuit generates multiple RF bursts from a single trigger event. Each RF burst packet is about 10 ns in width and the number of RF burst packets per trigger event is adjustable. There are two oscillators in the transmitter circuit. One is a gated burst rate oscillator and the other is a gated RF burst oscillator (or RF power output oscillator). The output RF oscillator starts with the same phase and amplitude characteristics when triggered. The frequency of the burst rate oscillator sets the spacing of the RF burst packets. The same spacing is built into a receiver section where the RF bursts are mixed or multiplied together with a known phase characteristic. Multiple bursts of RF at precisely spaced intervals can allow a receiver to average the RF bursts and increase the effective receiver sensitivity. Fixed component values around the RF oscillator set the frequency of the RF transmitter output. A bias driver circuit gates the RF output oscillator on and off and sets the RF burst packet width. The bias driver also level shifts the drive signal to the level that is required for the RF output device.

In the dual oscillator UWB multi-burst transmitter of the invention, a first oscillator, a gated burst rate oscillator, produces a relatively low frequency, i.e., MHz, square wave output for a selected transmit cycle. The first oscillator drives a second oscillator, a RF power output oscillator, which produces a spaced sequence of RF bursts of much higher frequency, i.e., GHz, during the transmit cycle. The first oscillator output passes through a bias driver to the second oscillator. The bias driver conditions, e.g., level shifts, the signal from the first oscillator for input into the second oscillator, and also controls the length of each RF burst. The second oscillator produces a RF burst on each cycle of the first oscillator signal. A trigger pulse actuates a timing circuit that controls the operation of the first oscillator, i.e., how long it oscillates (which defines the transmit cycle). The second oscillator then produces as many RF bursts as the number of cycles from the first oscillator during the transmit cycle. The RF frequency is determined by the second oscillator.

Figure 1:
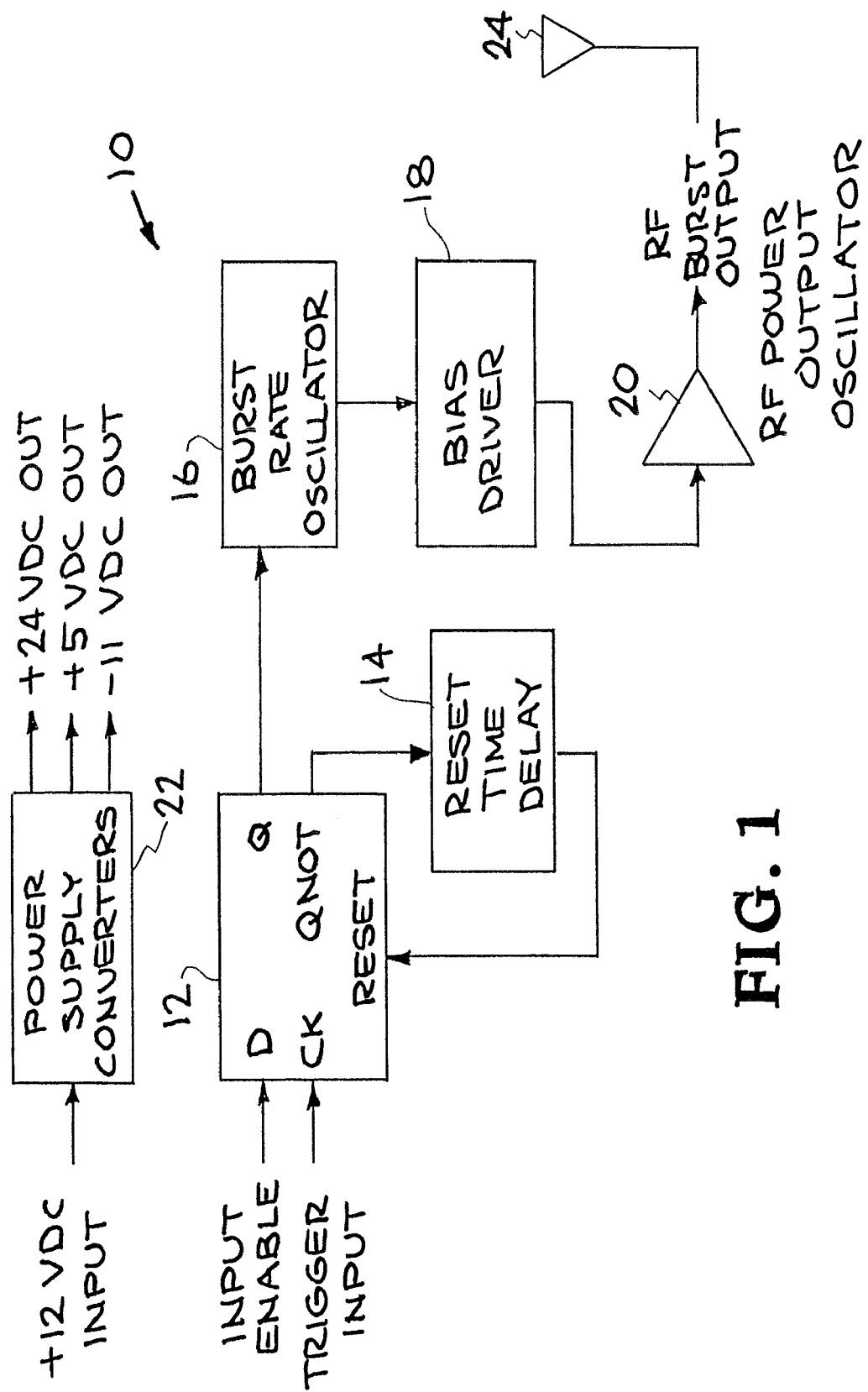
FIG. 1 is a schematic block diagram of an UWB multi-burst transmitter of the invention.

FIG. 1 is a block diagram of an ultra-wideband (UWB) multi-burst transmitter 10 of the invention. Transmitter 10 is comprised of a trigger input flip-flop 12 with an associated reset time delay circuit 14 that sets the total width of the transmit cycle, a gated burst rate oscillator 16, an output oscillator bias driver 18, and finally a RF burst or power output oscillator 20. Trigger input flip-flop 12 and associated reset time delay circuit 14 form a timing circuit for the gated burst rate oscillator 16. There are also power supply converters 22 used to provide the correct bias and operating voltages for the circuits. RF power output oscillator 20 is coupled to a transmit antenna 24.

Flip-flop 12 is a "D" type flip-flop having an input enable at its D input and a trigger input at its clock (CK) input. The Q output of flip-flop 12 is connected to burst rate oscillator 16. The QNOT output of flip-flop 12 is connected to reset time delay circuit 14, whose output is connected to the reset input of flip-flop 12.

Figure 2:
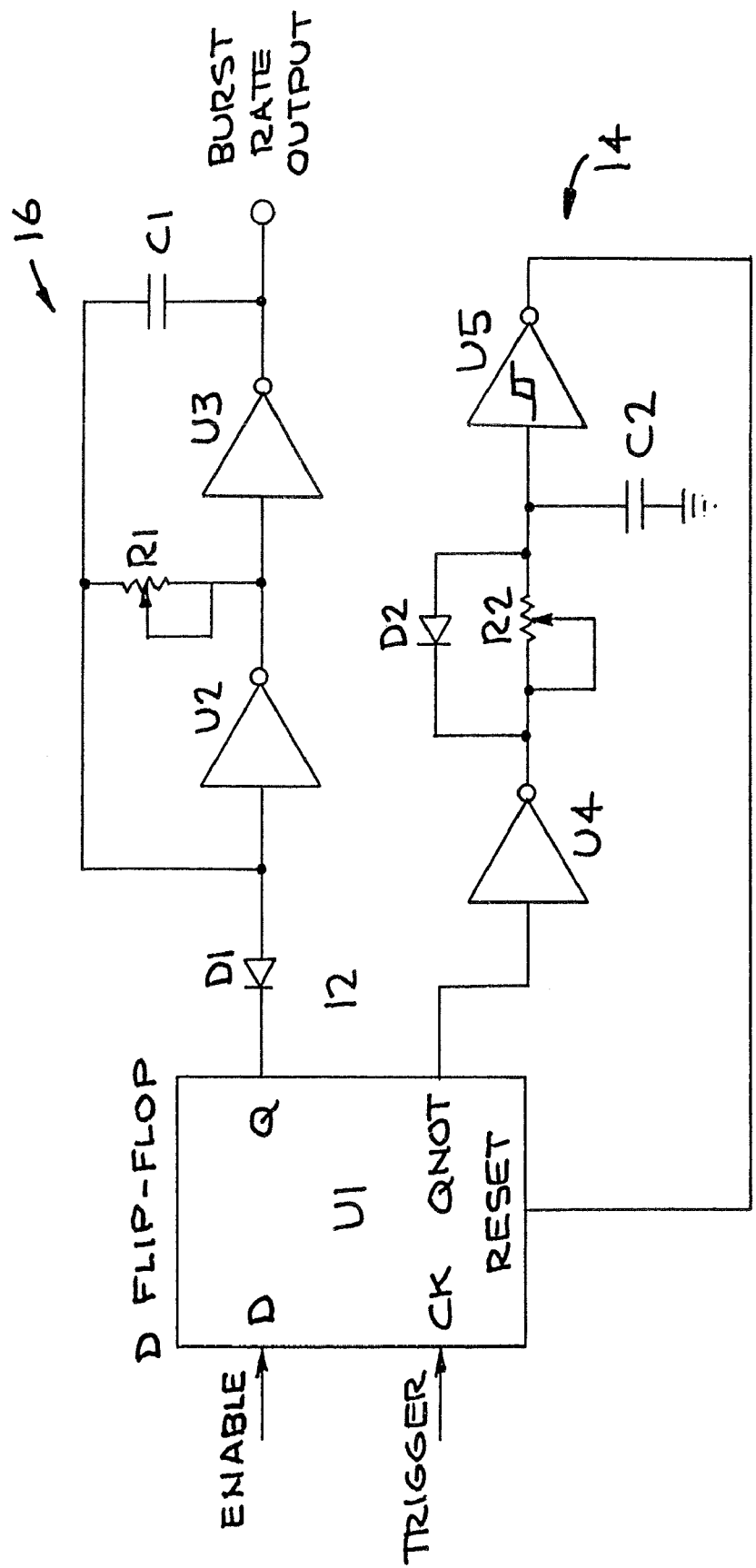
FIG. 2 is a circuit diagram of an embodiment of the gated burst oscillator section of the UWB multi-burst transmitter of FIG. 1.

FIG. 2 is a more detailed circuit diagram of an embodiment of the gated burst rate oscillator section, which includes the flip-flop 12, reset time delay circuit 14, and burst rate oscillator 16. Burst rate oscillator 16 is made up of diode D1, a pair of inverters U2 and U3 in series, capacitor C1, and variable resistor R1. Diode D1 is connected to the Q output of flip-flop 12 in a reverse direction. The input of U2 is connected to the other end of D1 and the output of U2 is connected to the input of U3. The output of U3 is connected in feedback through C1 and R1 to its input, and is also connected through C1 back to the input of U2.

The "D" type flip-flop 12 latches the trigger signal on its rising edge. The Q output of the flip-flop 12 then goes to a logic high level. The flip-flop Q output stays high until the flip-flop reset line is brought to a logic low level (by reset time delay circuit 14, as described below). When the flip-flop Q output goes to a high level, diode D1 becomes reverse biased and allows burst rate oscillator 16 to start operation.

R1, C1 and the input capacitance of U2 determine the frequency of the burst rate oscillator 16. CMOS inverters are preferably used for U2 and U3. These have a switching level of approximately one half of their power supply voltage. Because of this switching level, the value of C1 should be selected to be equal to the input capacitance of U2. This will allow for the most stable operation of the burst rate oscillator and prevent D1 from becoming forward biased. In an illustrative embodiment, this frequency is adjusted to 33 MHz. The period of this frequency is 30 ns and sets the spacing of the output RF bursts. By adjusting R1, the frequency can be adjusted to accommodate a matched delay set in the receiver circuit. The burst rate output (A) is sent to the bias driver circuit 18 shown in FIG. 3.

The reset time delay circuit 14 shown in FIG. 2 is comprised of inverter U4, logic gate U5, diode D2, variable resistor R2 and capacitor C2. The QNOT output of flip-flop 12 is connected to the input of U4, whose output is connected through R2 to the input of U5. Diode D2 is connected in a reverse direction in parallel across R2, i.e., from the output of U4 to the input of U5. The input of U5 is also connected through C2 to ground. The output of U5 is connected to the RESET input of flip-flop 12.

When the CK input of flip-flop 12 is triggered, QNOT goes from a high logic level to a low logic level. Further trigger inputs will be ignored until the reset circuit 14 has timed out and resets the flip-flop 12. U4 inverts this level and charges C2 through R2. When C2 reaches the switch threshold of U5, the output of U5 goes to a logic low level and resets the flip-flop 12. U5 can be a Schmitt trigger gate to allow for very long reset times; this lets the burst rate oscillator run for many cycles. Once the flip-flop 12 is reset, C2 discharges rapidly through D2 and the reset line is brought back to a high level. The flip-flop 12 can now accept a new trigger input. The enable line of the flip-flop 12 allows for external control of the trigger line. The enable line must be high for the input trigger line to function.

Figure 3:
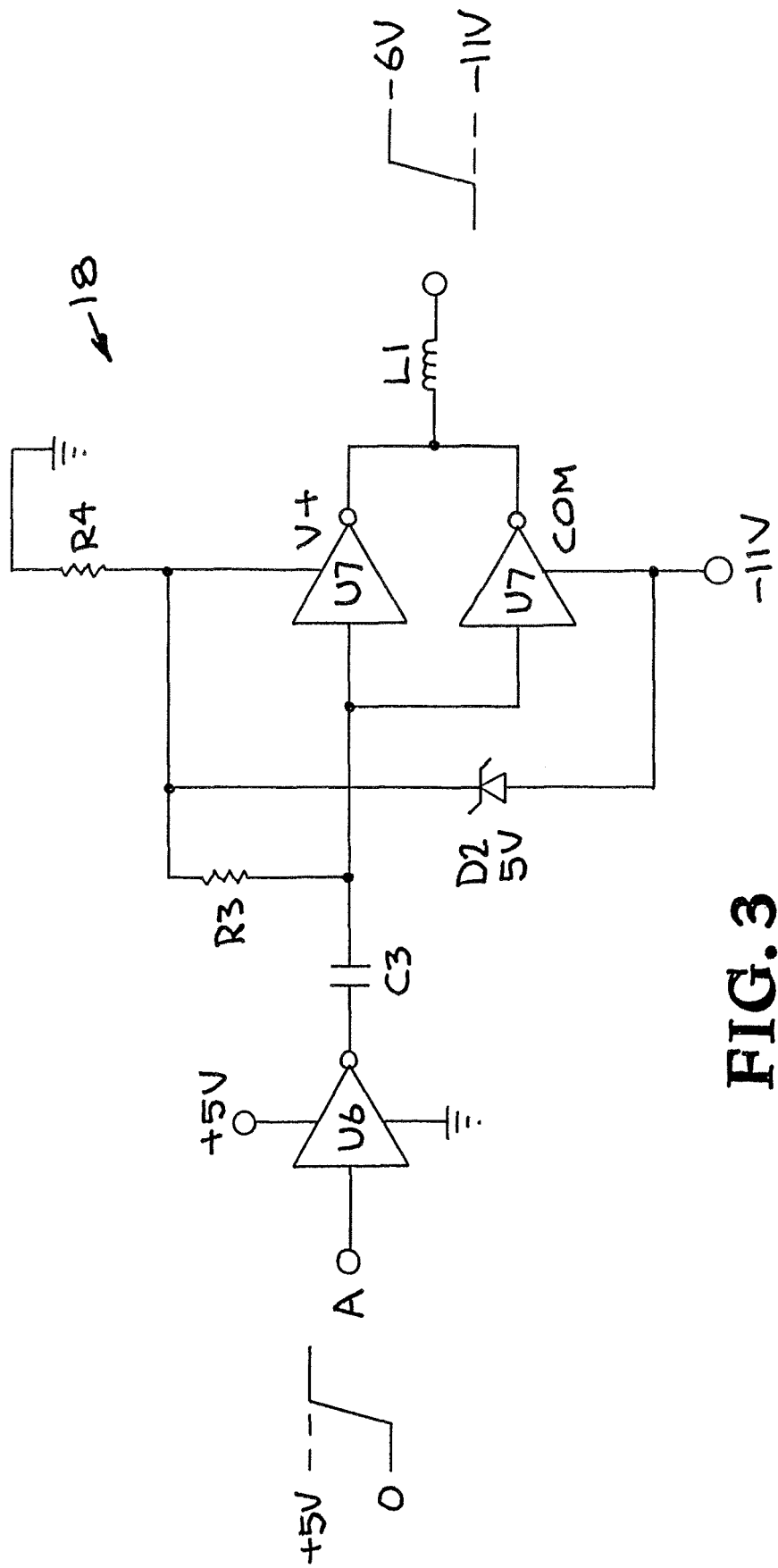
FIG. 3 is a circuit diagram of an embodiment of the bias driver of the UWB multi-burst transmitter of FIG. 1.

An embodiment of the bias driver 18 of the UWB transmitter is shown in FIG. 3. Bias driver 18 is made up of an inverter U6, whose output is connected through capacitor C3 to the inputs of a parallel pair of inverters U7, whose outputs are connected through an inductor L1 to the RF power output oscillator 20. The inputs to inverters U7 are connected through resistors R3 and R4 to ground. The V+ input of one inverter U7 is also connected through R4 to ground. The COM input of the other inverter U7 is connected to −11V (from power supply converters 22 of FIG. 1) and also through a 5V zener diode Dz and R4 to ground. C3 and R3 form a differentiator.

The bias driver 18 level shifts drive signal levels for use by an output power transistor in the RF power output oscillator 20. The bias driver 18 also sets the width of the RF output burst. U6 inverts the signal (A) from the gated burst rate oscillator 16. This inverted signal is differentiated by C3 and R3. This differentiated signal is the input signal to the level shifted driver gates U7 and sets the width of the RF output burst. The power supply is level shifted by Dz and R4 to provide the correct gate voltage drive levels to the output power transistor. The logic levels at the output of U7 swing between −11V and −6V. L1 buffers these drive levels and provides a sufficiently high impedance to allow the RF power transistor to oscillate when U7 is at a logic high level.

Figure 4:
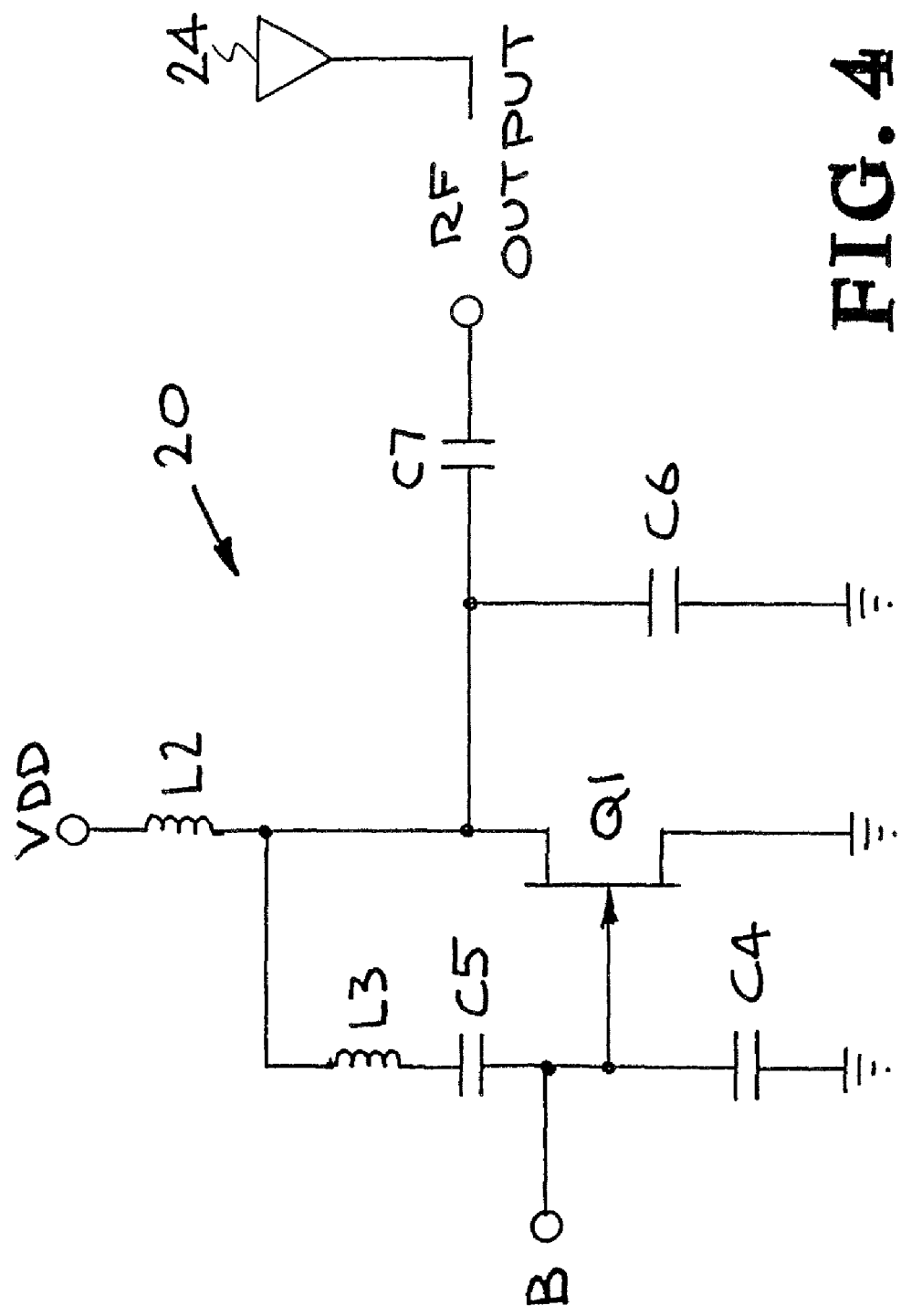
FIG. 4 is a circuit diagram of an embodiment of the RF burst (power output) oscillator of the UWB multi-burst transmitter of FIG. 1.

An embodiment of the RF power output oscillator or RF burst oscillator 20 is shown in FIG. 4, and is based on a RF power transistor Q1, which is preferably a MESFET. The signal (B) from bias driver 18 is applied to the gate of Q1, which is also connected through capacitor C4 to ground, and through series capacitor C5, inductor L3 and inductor L2 to voltage supply VDD. The drain of Q1 is connected to ground, and the source of Q1 is connected through L2 to VDD. The source of Q1 is also connected through capacitor C6 to ground, and through capacitor C7 to the RF output.

The power output oscillator 20 generates the RF output that feeds a transmit antenna 24. An illustrative implementation generates 1.5 GHz bursts that are 10 ns in duration. The output MESFET is powered from a 24 VDC source (VDD) through L2. The oscillator starts with the same phase characteristic when the drive input (B) is brought to the midpoint bias level of the MESFET gate. The output stage is a short burst Clapp oscillator design. The frequency of oscillation is determined by the values of C4, C5, C6, L3 and the internal capacitances of Q1.

Figure 5:
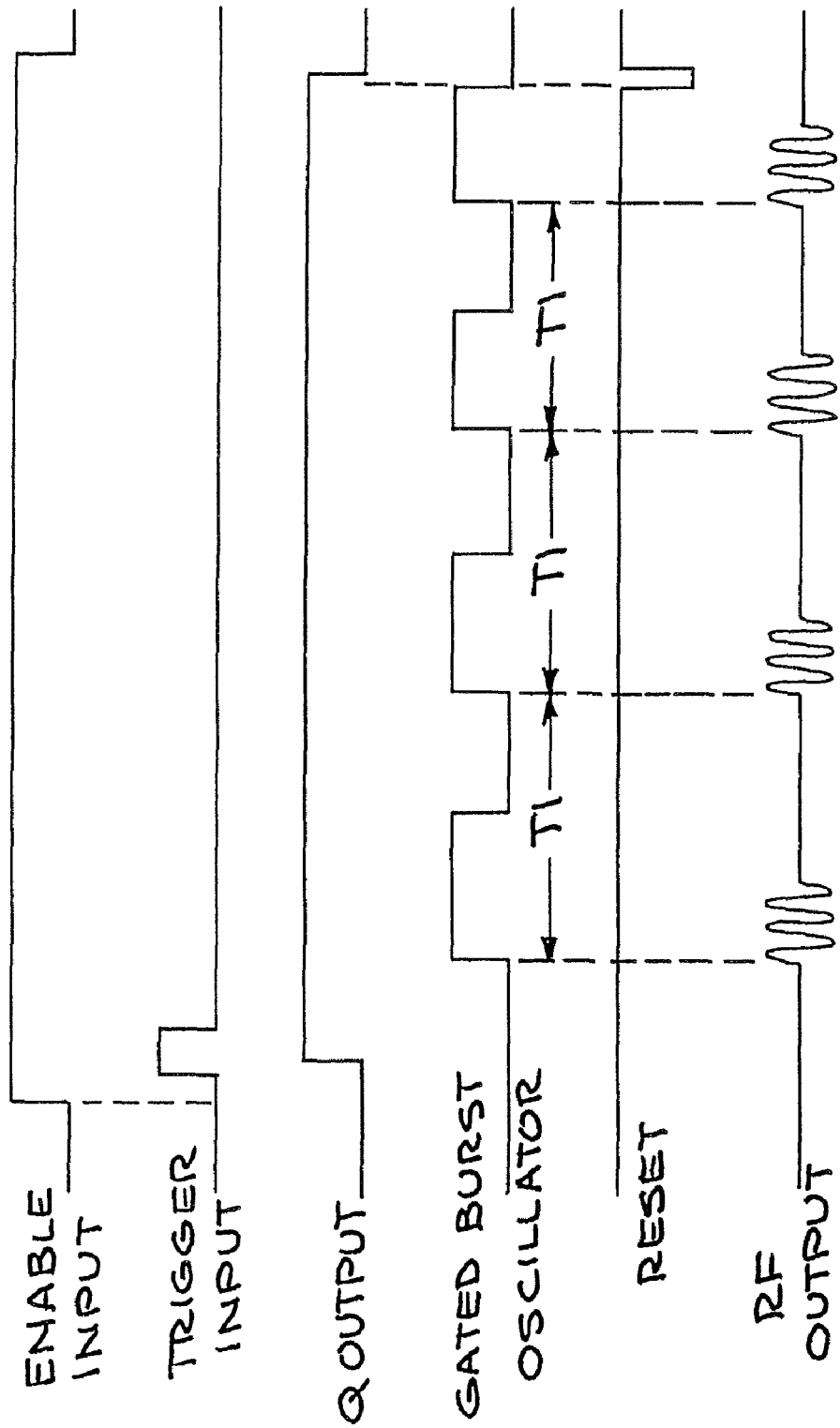
FIG. 5 is a timing diagram for the UWB multi-burst transmitter of FIG. 1.
Figure 6A:
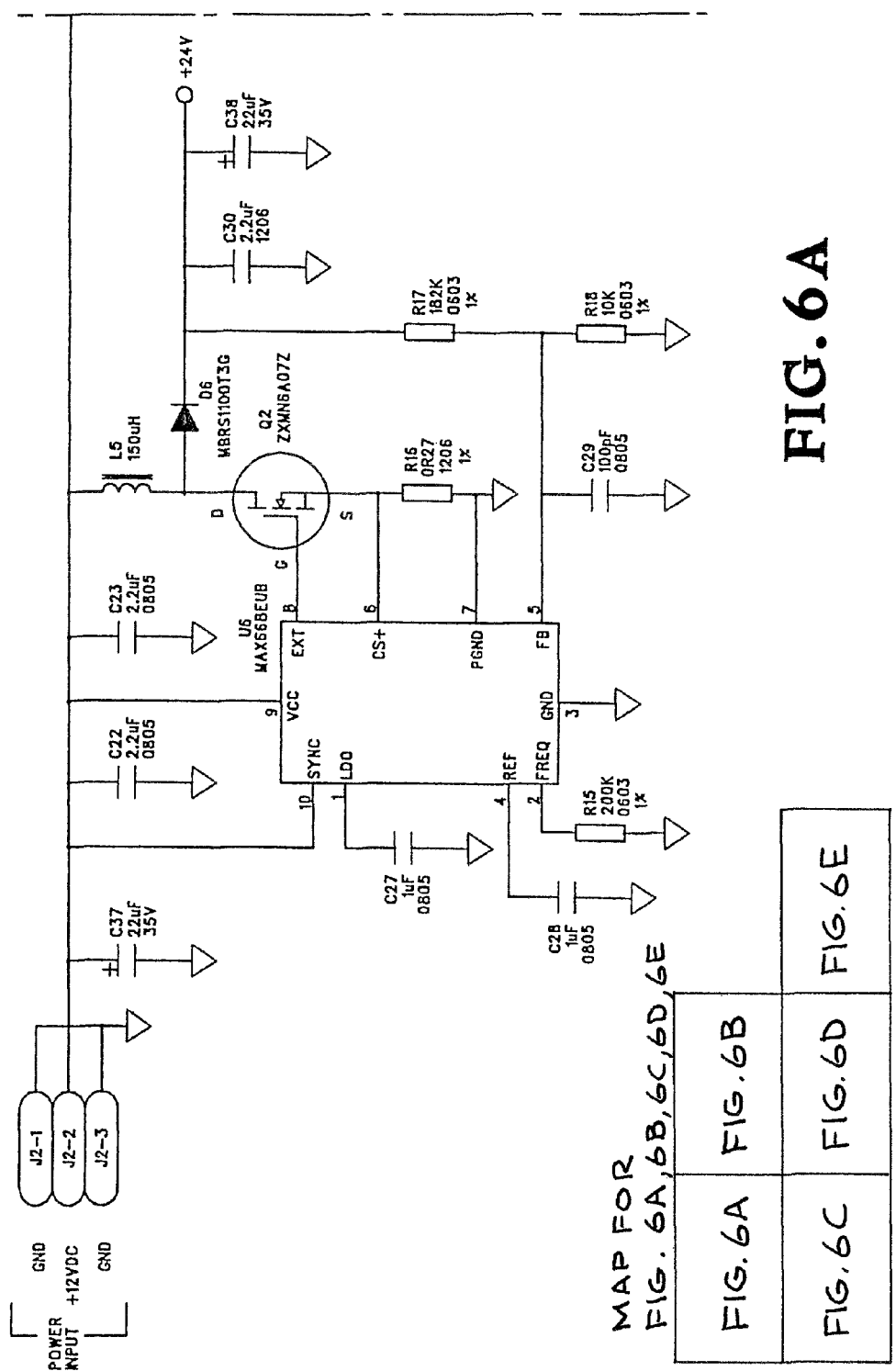
FIG. 6 is a schematic of an embodiment of the invention.
Figure 6B:
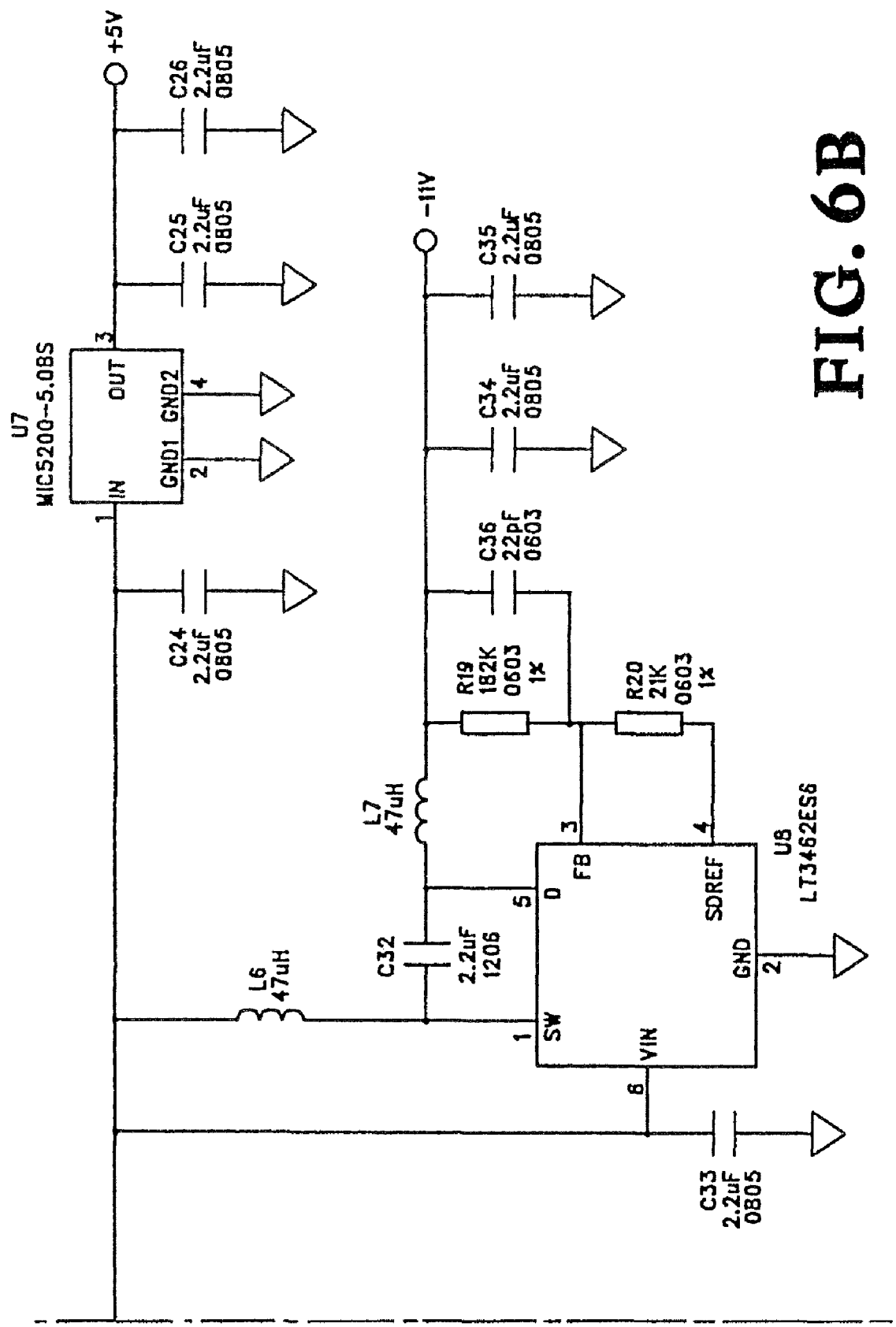
Figure 6C:
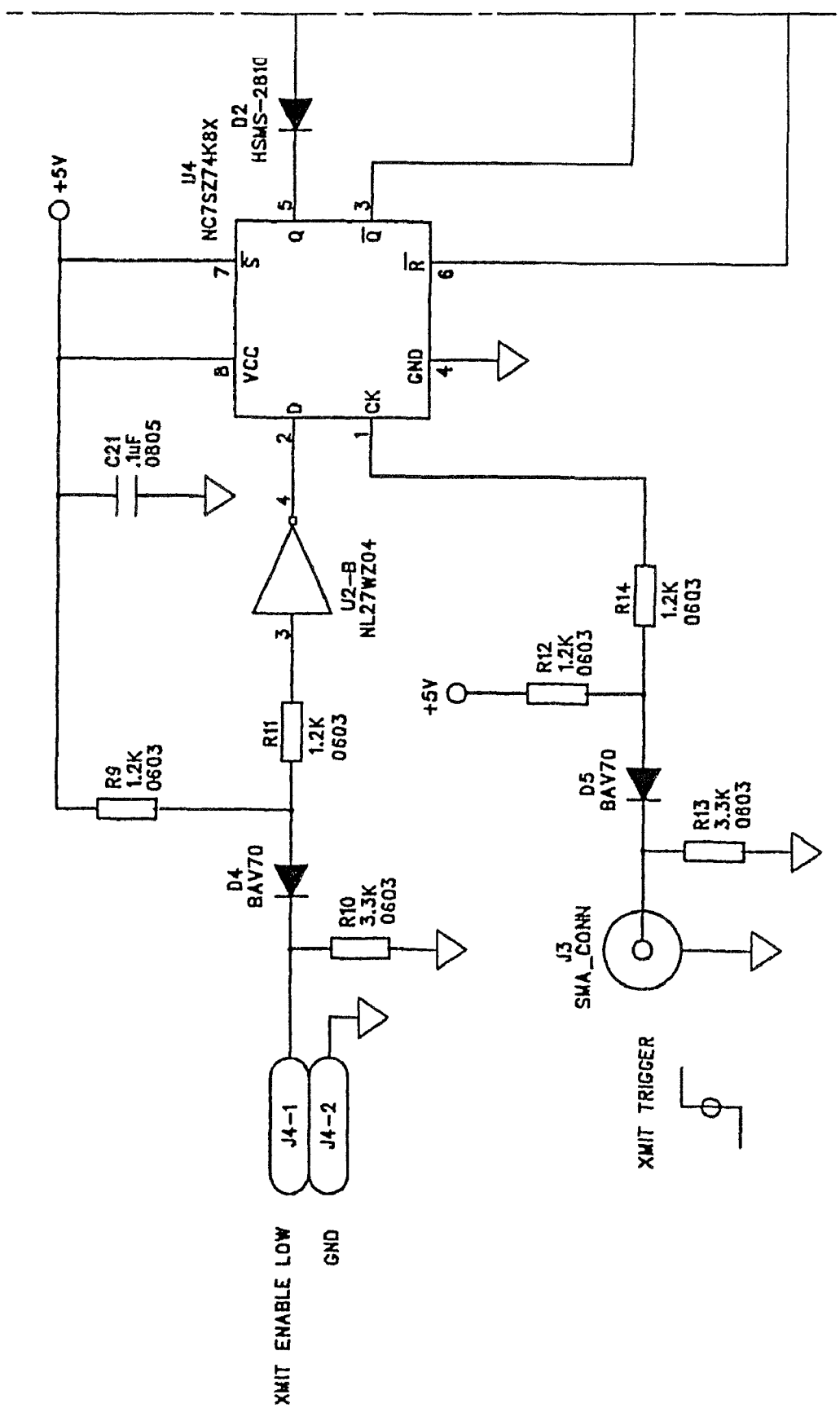
Figure 6D:
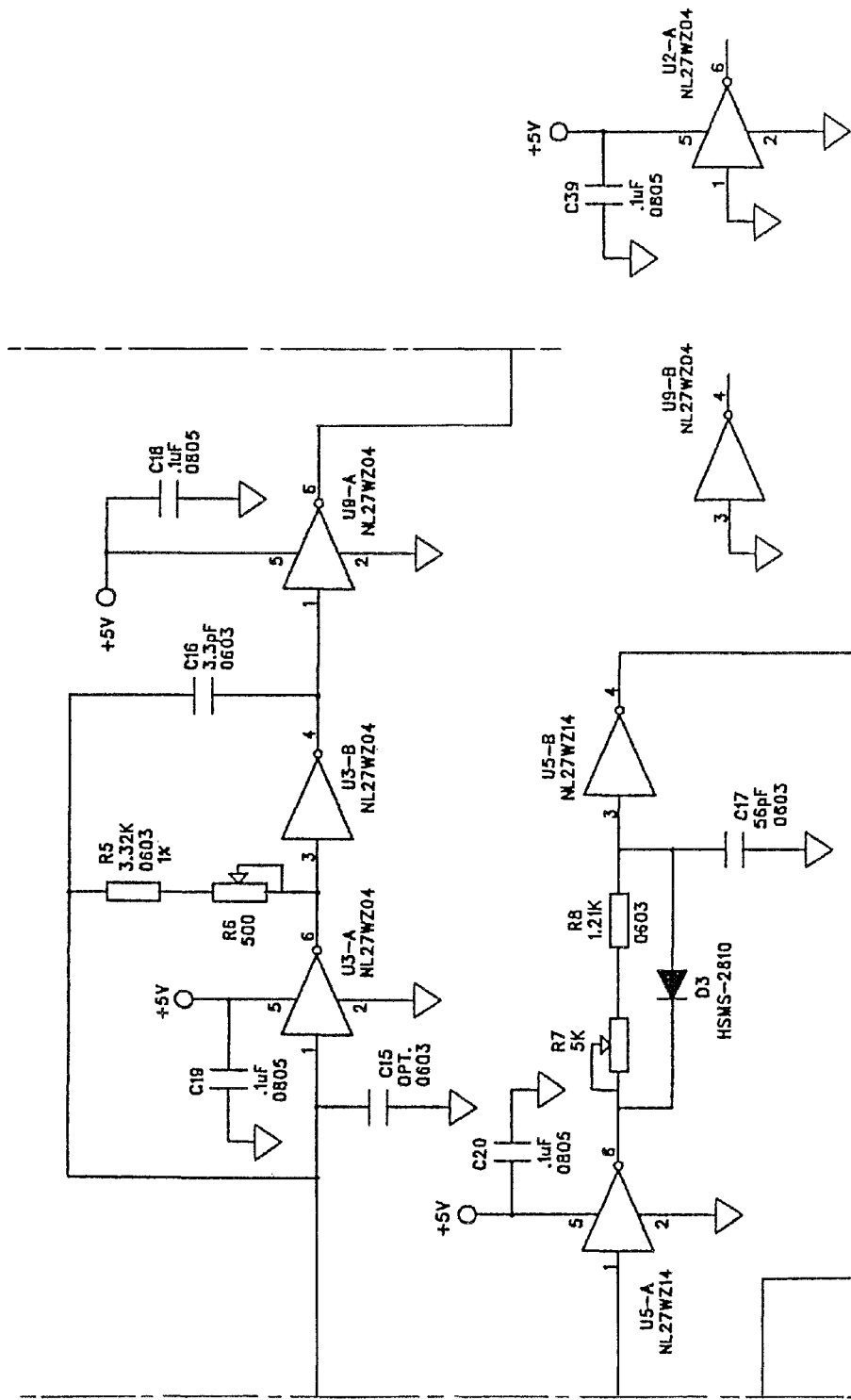
Figure 6E:
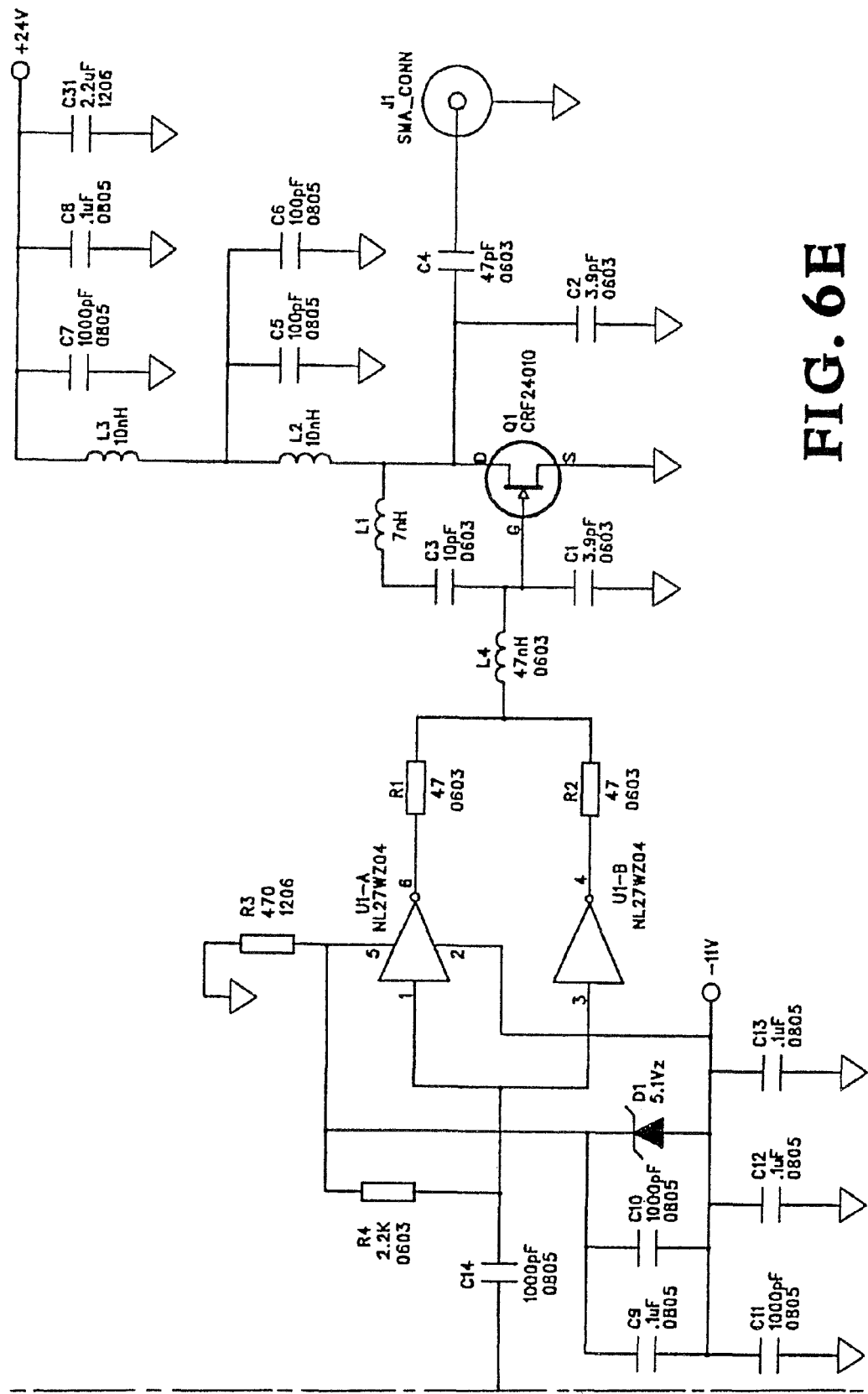

FIG. 5 shows the relative timing of the signals for the UWB multi-burst transmitter of the invention. The ENABLE INPUT signal must be applied to the D input of the flip-flop 12 for the transmitter 10 to operate. The TRIGGER INPUT signal then produces the Q OUTPUT signal which actuates the gated burst oscillator 16, which produces the GATED BURST OSCILLATOR signal. This oscillation, with a period T1, continues until the reset time delay circuit 14 generates a RESET signal, which causes the Q OUTPUT signal to go low, which stops the gated burst oscillator. The leading edges of each cycle of the GATED BURST OSCILLATOR signal result in the RF OUTPUT bursts. The bursts of the RF OUTPUT signal always start up in phase, i.e., with the same phase. The Q OUTPUT signal defines the transmit cycle. The number of cycles and the period of the GATED BURST OSCILLATOR signal determine the number and spacing of the RF OUTPUT bursts. The length of each RF burst is set by the bias driver 18, and the frequency of the oscillations in each burst is determined by the parameters of the RF power output oscillator 20.

The invention also includes a method of generating a precisely spaced sequence of UWB RF bursts, each starting with the same phase, from a single trigger event. From a trigger input signal, a timing signal is generated which defines a transmit cycle. The timing signal controls a first oscillator to produce a number of cycles of a relatively low frequency, i.e., MHz, square wave output during the transmit cycle. The first oscillator drives a second oscillator to produce a spaced sequence of RF bursts of much higher frequency, i.e., GHz, during the transmit cycle. RF bursts are produced by the second oscillator on each cycle of the first oscillator signal. The output of the first oscillator is conditioned before driving the second oscillator. The RF bursts are coupled to a transmit antenna. A reset signal is generated to control the length of the timing signal and transmit cycle.

The invention thus provides an ultra-wideband (UWB) transmitter that is useful for UWB communications, e.g., in a system with a delay and multiply receiver. The system is relatively high power, e.g., 40-50 V. The transmitter generates precisely spaced, same starting phase RF bursts. In an illustrative embodiment, 1.5 GHz RF bursts of 10 ns duration spaced 30 ns apart are generated. The number of bursts may range from two to a large number. FIG. 6 is a schematic of an embodiment of the invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

I claim:

1. An ultra-wideband (UWB) multi-burst transmitter, comprising:
   a timing circuit actuated by a single trigger pulse to set the length of a transmit cycle;
   a gated burst rate oscillator connected to and controlled by the timing circuit to generate an output signal comprising a plurality of cycles during the transmit cycle;
   a bias driver connected to the gated burst rate oscillator; and
   a RF burst oscillator connected to the bias driver and actuated thereby in response to the output signal from the gated burst rate oscillator to generate a sequence of RF bursts, one RF burst for each cycle of the output signal from the gated burst rate oscillator during the transmit cycle.

2. The transmitter of claim 1, wherein the gated burst rate oscillator operates at a lower frequency than the RF burst oscillator.

3. The transmitter of claim 2, wherein the gated burst rate oscillator is a MHz frequency oscillator and the RF burst oscillator is a GHz frequency oscillator.

4. The transmitter of claim 1, wherein the timing circuit comprises a flip-flop and a reset time delay circuit connected from an output of the flip-flop to its reset input, wherein the flip-flop provides an actuation signal to the gated burst rate oscillator upon receiving a trigger pulse and until the reset time delay circuit resets the flip-flop.

5. The transmitter of claim 4, wherein the flip-flop comprises a D flip-flop having its D input connected to an input enable signal, its clock input connected to a trigger signal, its Q output connected to the gated burst rate oscillator, and its QNOT output connected to the reset time delay circuit.

6. The transmitter of claim 5, wherein the reset time delay circuit comprises an inverter having its input connected to the QNOT output of the flip-flop, a variable resistor connected to the inverter output, a logic gate having its input connected to the opposed end of the variable resistor and its output to the reset input of the flip-flop, a diode connected in a reverse direction in parallel across the variable resistor, and a capacitor connected from the input of the logic gate to ground, wherein the capacitor begins to charge when the flip-flop receives the trigger pulse and upon reaching a charge threshold triggers the logic gate to reset the flip-flop.

7. The transmitter of claim 6, wherein the variable resistor is adjusted to select the length of the transmit cycle.

8. The transmitter of claim 6, wherein the logic gate is a Schmitt trigger gate.

9. The transmitter of claim 1, wherein the gated burst rate oscillator comprises a diode connected in a reverse direction to the output of the timing circuit, a pair of inverters in series with the input of the first being connected to the opposed end of the diode, a capacitor, and variable resistor, the output of the second inverter being connected in feedback through the capacitor and variable resistor to its input, and also being connected through the capacitor back to the input of the first inverter.

10. The transmitter of claim, 9 wherein the inverters are CMOS inverters.

11. The transmitter of claim, 9 wherein the variable resistor is adjusted to select the frequency of the gated burst rate oscillator.

12. The transmitter of claim 1, wherein the RF burst oscillator comprises a RF power transistor, and a Clapp oscillator output stage connected to the output power transistor.

13. The transmitter of claim 12, wherein the RE power transistor is a MESFET having its gate connected to the bias driver and its source to the Clapp oscillator output stage.

14. The transmitter of claim 1, wherein the RF burst oscillator comprises a MESFET having its gate connected to the bias driver; a first capacitor connected from the MESFET gate to ground; a second capacitor, a first inductor, and a second inductor connected in series from the MESFET gate to a voltage supply; the MESFET drain being connected to ground; the MESFET source being connected through the third inductor to the voltage source; a third capacitor connected from the MESFET source to ground, and a fourth capacitor connected from the MESFET source to the RF output.

15. The transmitter of claim 14, wherein the capacitors and inductors are selected to select the RF frequency.

16. The transmitter of claim 1, wherein the bias driver comprises means for gating the RF burst oscillator on and off, means for level shifting the output signal from the gated burst rate oscillator for input into the RF burst oscillator and means for setting the length of the RF burst.

17. The transmitter of claim 1, wherein the bias driver comprises an inverter, a differentiator connected to the output of the inverter, a parallel pair of level shifted inverters connected to the differentiator, and a buffer inductor connected to the outputs of the inverters.

18. The transmitter of claim 17, further comprising a zener diode connected from a power input of a first of the pair of inverters to the power input of the second of the pair of inverters, and a resistor connected from the power input of the second inverter to ground, the power input of the first inverter being connected to a power source.

19. The transmitter of claim 1, further comprising a transmit antenna connected to the output of the RF burst oscillator.

20. A method of generating a precisely spaced sequence of ultra-wideband (UWB) RF bursts, each starting with the same phase, from a single trigger pulse, comprising:
generating a timing signal from the trigger pulse, the timing signal defining a transmit cycle;
controlling a first oscillator by the timing signal to produce a number of cycles of a relatively low frequency square wave output during the transmit cycle; and
driving a second oscillator with the output of the first oscillator to produce a spaced sequence of RF bursts of much higher frequency during the transmit cycle, an RF burst being produced by the second oscillator on each cycle of the first oscillator signal.

21. The method of claim 20, wherein the first oscillator produces an output with a frequency in the MHz range and the second oscillator produces RF bursts with a frequency in the GHz range.

22. The method of claim 20, further comprising conditioning the output of the first oscillator before driving the second oscillator.

23. The method of claim 20, further comprising coupling the RF bursts to a transmit antenna.

24. The method of claim 20, further comprising generating a reset signal to control the length of the timing signal and transmit cycle.

* * * * *